United States Patent [19]

Herron et al.

[11] Patent Number: 4,938,522
[45] Date of Patent: Jul. 3, 1990

[54] PROTECTIVE VEHICLE COVER

[75] Inventors: Robert A. Herron; Brian J. Chapman, both of Mississauga, Ontario, Canada

[73] Assignee: Automotive Protective Jackets, Inc., Mississauga, Ontario, Canada

[21] Appl. No.: 221,129

[22] Filed: Jul. 19, 1988

[30] Foreign Application Priority Data

Jul. 20, 1987 [CA] Canada .................. 542552

[51] Int. Cl.⁵ .............................................. B60J 11/00
[52] U.S. Cl. ...................................... 296/136; 150/166
[58] Field of Search ......................... 296/136, 95.1; 150/52 K

[56] References Cited

U.S. PATENT DOCUMENTS

| 2,243,981 | 6/1941 | Rowan | 296/136 |
| 3,130,078 | 4/1964 | Lewis et al. | 296/136 |
| 4,612,967 | 9/1986 | Kamen et al. | 296/136 |
| 4,635,993 | 1/1987 | Hooper et al. | 296/95.1 |

FOREIGN PATENT DOCUMENTS 577167  5/1958  Italy ................................ 296/136
253219 11/1986  Japan .

Primary Examiner—Robert R. Song
Attorney, Agent, or Firm—Jeffers, Hoffman & Niewyk

[57] ABSTRACT

A protective cover snugly fits over an automobile having a cleaned polished surface and protects same while the automobile is in the open. The cover includes flared side panels, a bumper panel, hood panel, windshield panel, roof panel, rear window panel and tail panel all connected together by seams and closely fitting the corresponding surfaces of the automobile. In particular the seams are non-coincident with corners of the automobile so that stress on the seams is avoided. Also, the cover has a flap in one side panel, especially on the driver's side which can be opened to permit access to the automobile, in such case windows are included in the cover so that the automobile can be operated with the cover fitted thereon. The cover particularly has a water-proof outer layer and an air permeable, polishing inner layer.

9 Claims, 2 Drawing Sheets

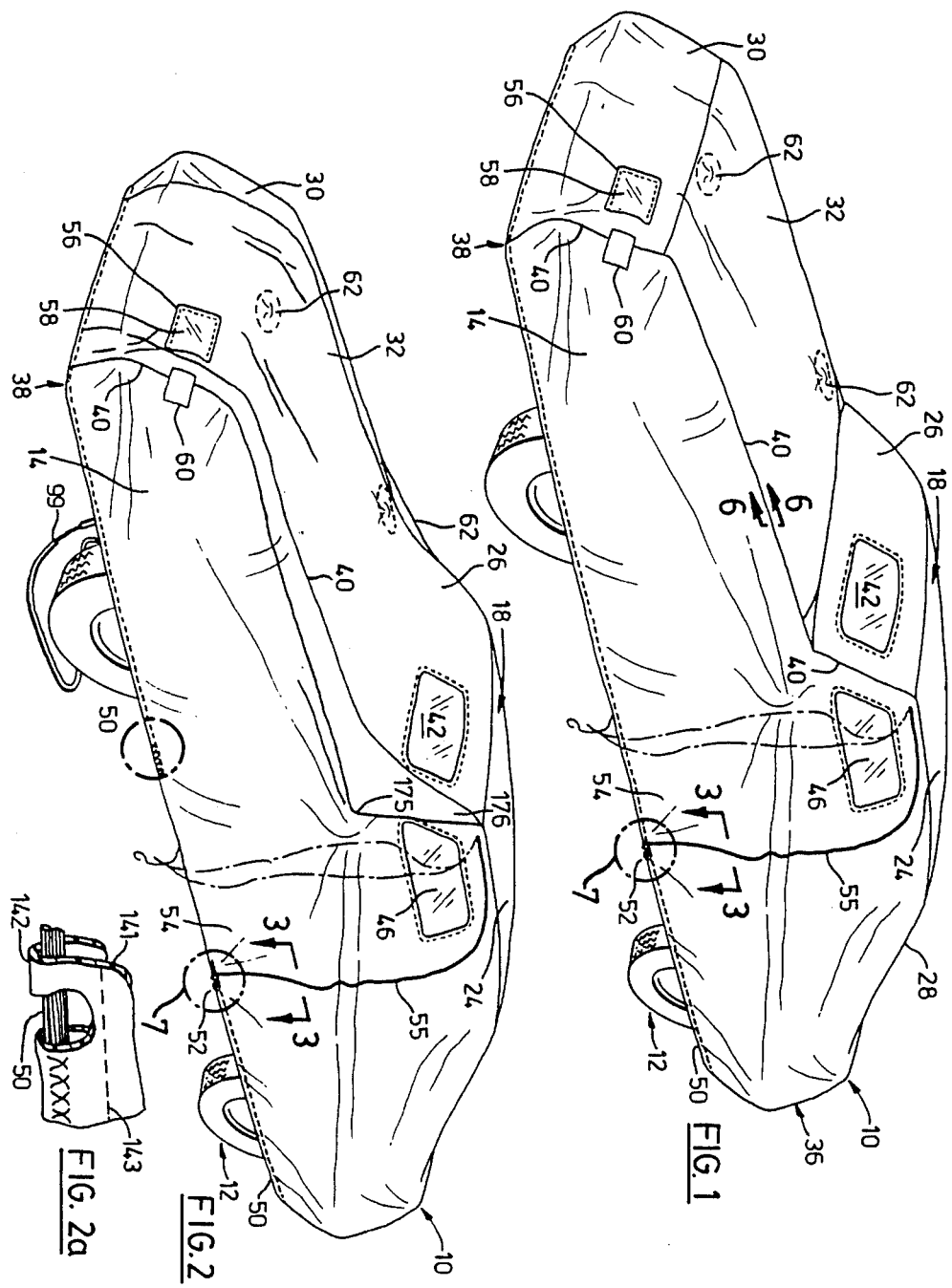

PROTECTIVE VEHICLE COVER

FIELD OF INVENTION

This invention relates to a protective cover for an automobile; more especially the invention is concerned with a cover to protect a new automobile standing in the open air at the location of the showroom and awaiting collection by the purchaser.

Prior to collection by the purchaser of a new automobile from a dealer, the automobile is cleaned and polished after routine checks and finishing operations are carried out.

Frequently the cleaned and polished new automobile awaits collection by the purchaser in an open area adjacent the automobile showroom. At this time the new automobile is exposed to the elements, for example, rain and to dust in the air. In some cases the purchaser does not collect the automobile at the expected time and thus the automobile may spend a long period exposed to the environment after being cleaned and polished; in such case the cleaned and polished appearance may be lost.

PRIOR ART

Covers have been proposed for automobiles, however, these are generally shapeless and the effect of the covered automobile is not pleasing; furthermore, access to the automobile is not possible without prior removal of the cover, and the automobile can not be moved even a short distance within the waiting area without prior removal of the cover, which results in exposure to the environment.

A further disadvantage of prior covers is that they usually are air and water permeable and fit loosely about the automobile. Thus moisture and dirt carried therewith gains access to the interior of the cover and condenses on the polished surface of the automobile producing a cloudy film. Even if the prior covers are made of a waterproof material, because of the loose fit, moisture and water vapour and some dust or dirt gets under the cover and condenses causing the surface finish to get dirty.

The present invention provides a protective cover which overcomes disadvantages associated with prior covers and which is particularly adapted to fit snugly on a cleaned and polished automobile to present a pleasing appearance while protecting the cleaned and polished surface of the automobile.

In accordance with the invention a protective cover for snugly fitting over an automobile comprises first and second side panels shaped to fit snugly against side walls of the automobile; front, top and rear panel members shaped to fit snugly against front, top and rear portions of the automobile between such side walls; and an open end defined by outer edges of the side panels and outer edges of the front and rear panel members.

In one aspect of the invention, seams between the panel members and between the panel members and the side panels are located so as to be at non-stress points of the cover when fitted on the automobile. In particular, the seams are located so as to be non-coincident with and spaced-apart from stress points on the cover defined by the corners of the automobile, for example, the corner defined at the juncture of the roof and sides of the automobile.

In another aspect of the invention, a flap is formed in the first side panel from a portion of such panel; the flap has an outer flap edge and the first side panel has an inner panel edge. A closure means between the outer flap edge and the inner panel edge holds the flap edge and inner panel edge in adjacent relationship to complete the first side panel. The closure means is disengageable or openable to separate the flap edge from the inner panel edge to permit a door of the automobile fitted with the cover to be opened allowing access to the automobile.

In still another aspect of the invention each of the side panels and the front, top and rear panel members comprises a water-proof outer layer and an air-permeable, polishing inner layer. The inner and outer layers are in opposed facing relationship and may be laminated together for substantially the full extent of their facing surfaces, or may be laminated only in marginal zones to form an air chamber between the inner and outer layers.

The invention is illustrated in particular and preferred embodiments by reference to accompanying drawings in which:

FIG. 1 is a perspective view from the front and driver's side of a protective cover of the invention fitted on an automobile;

FIG. 2 is a perspective view from the front and driver's side of another embodiment of the cover fitted on an automobile;

FIG. 2a is an enlarged view, partially broken away, contained within the chain-dotted circle of FIG. 2;

Figure 3:
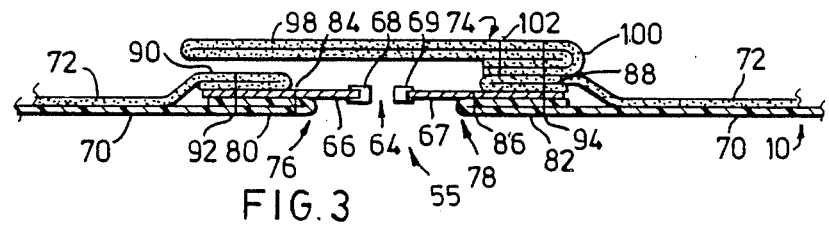
FIG. 3 shows a cross-section on line 3—3 of FIG. 1 illustrating a closure for the cover of the invention.

With reference to FIG. 1, a protective cover 10 is snugly fitted over and on an automobile 12 with a driver's side mirror.

Cover 10, so fitted, is generally convex with an open end 38 at its lower edge, as shown in FIG. 1. An elastic shock cord 50 around the periphery of open end 38 is biased to close open end 38 to insure a snug fit of cover 10 to the automobile 12.

Cover 10 includes a side panel member 14 on the driver's side of the automobile 12, a corresponding side panel member 16 on the passenger's side (not shown), and an upper panel member 18.

Upper panel member 18 includes a roof panel 24, a windshield panel 26, a rear window panel 28, a front bumper panel 30, a hood panel 32, a rear trunk panel 36 and a rear window panel 28. The various panels mentioned above are connected by seams 40 described in more detail below. Windows 42 and 46 are formed in windshield panel 26 and side panel member 14, respectively. Windows are also formed on rear window panel 28 and passenger's side panel member (not shown).

Free ends of the elastic cord 50 are secured by a fastener 52, which may be a conventional snap hook.

Side panel member 14 has a flap 54 formed therein and closure 55.

A pocket 56 having a transparent window 58 is formed in front bumper panel 30 to receive an identification card 60.

Pads 62 are disposed on the underside of hood panel 32 to contact the hood ornament and antenna mount of the automobile 12.

With further reference to FIG. 3, there is shown a detail of closure 55 in a first embodiment. In particular, closure 55 includes a zipper 64 having zipper tapes 66 and 67; zipper teeth 68 being associated with zipper tape 66 and zipper teeth 69 being associated with zipper tape 67.

The material of cover 10 comprises a water-proof outer layer 70 laminated to an air permeable, polishing inner layer 72. For the purposes of this disclosure, the term water-proof is not intended to mean absolutely waterproof. The term includes materials that are water repellent, some of these materials being air permeable or breathable, and while these materials prevent rain from passing therethrough, some amount of moisture or water vapour can pass through them, perhaps by osmosis or some such mechanism.

The closure 55 further includes an inner sealing flap 74, an outer flap edge 76 and an inner panel edge 78.

Outer flap edge 76 includes a flap fold 80 which particularly comprises a fold of layer 70, and an inner fold 90 which is a fold of inner layer 72.

Inner panel edge 78 comprises a panel fold 82 which similarly comprises a fold of outer layer 70 and an inner fold 88 formed from a fold of inner layer 72.

Inner sealing flap 74 comprises a double layer 98 of material of inner layer 72 and includes a fold 100. Sealing flap 74 extends behind tapes 66 and 67 of zipper 64 and forms a seal of closure 55, having a polishing layer 72 as the innermost layer to prevent zipper 64 from scratching the automobile surface.

Outer flap edge 76 is completed by a stitch 84 extending through zipper tape 66 and flap fold 80, and a stitch 92 extending through flap fold 80, zipper tape 66 and inner fold 90.

Inner panel edge 78 is completed by a stitch 86 extending through zipper tape 67 and panel fold 82 and a stitch 94 which extends through panel fold 82, zipper tape 67, inner fold 88 and fold 100. Fold 100 is itself completed by a stitch 102.

Figure 3A:
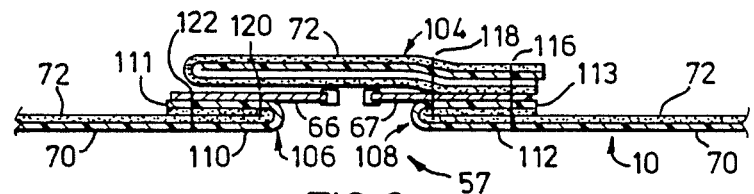
FIG. 3a shows a closure for the cover of the invention in a different embodiment.

With reference to FIG. 3a, there is shown a variant of the closure 55 illustrated in FIG. 3, in which closure 55 is designated 57 and wherein, for convenience, identical parts to those shown in FIG. 3 have been given the same reference numerals.

Thus with reference to FIG. 3a, the material of cover 10 comprises water-proof outer layer 70 and air permeable, polishing inner layer 72. The closure 57 includes an inner sealing flap 104, an outer flap edge 106 and an inner panel edge 108.

Outer flap edge 106 includes a fold 110 of the material of cover 10, having an inner double layer 111. Inner panel edge 108 similarly includes a fold 112 formed by folding the material of cover 10 and includes an inner double layer 113.

The inner sealing flap 104 is likewise formed by folding material from which cover 10 is formed to provide a quadruplicate layer with a polishing layer 72 as the inner most layer.

Outer flap edge 106 is completed by stitch 120 which extends through the inner double layer 111 and zipper tape 66; and stitch 122 which extends through fold 106 and zipper tape 66.

Inner panel edge 108 is completed by stitch 116 which extends through fold 112, zipper tape 67 and inner sealing flap 104; and stitch 118 which extends through inner double layer 113, zipper tape 67 and inner sealing flap 104.

Figure 4:
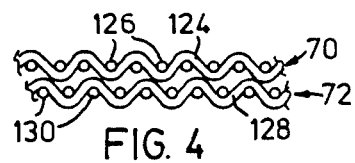
FIG. 4 illustrates schematically one embodiment of the material of the cover.

With reference to FIG. 4 there is shown a detail of the material of cover 10 in one embodiment, wherein outer layer 70 is composed of a woven material having yarns 124 and 126 (sometimes referred to as warp and fill) and inner layer 72 is composed of a woven or knitted material having yarns 128 and 130. Outer layer 70 is coated or impregnated on one or both sides (not shown) to make it water repellent or waterproof as described above and below.

Figure 5A:
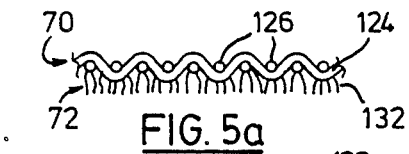
FIGS. 5a to 5c illustrate schematically additional embodiments of the material of the cover.

With reference to FIG. 5a there is shown an alternative embodiment of the material of cover 10, in which outer layer 70 is of woven or knitted material having yarns 124 and 126, as for FIG. 4, and inner layer 72 is composed of fibres or pile or soft fabric 132 adhered to layer 70 by a suitable adhesive or other means.

Figure 5B:
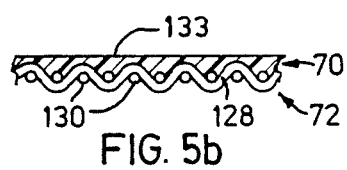

With reference to FIG. 5b, a still further embodiment of the material of cover 10 is shown in which the outer layer 70 is itself a waterproof coating 133 such as a polyurethane, and inner layer 72 is composed of a woven material having yarns 128 and 130. A suitable material for inner layer 72 is nylon or polyester, or blends of same, where the yarn is from 70 to 200 denier. This material is still considered to be a polishing layer for the purposes of this disclosure, although it may not be as soft and have quite the same polishing effect as the pile or fabric 132 of the FIG. 5a embodiment.

Figure 5C:
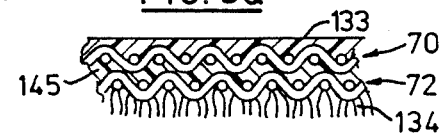

FIG. 5c shows yet another embodiment of the material of cover 10, in which outer layer 70 is formed of a coated material comprising the combined layers 70, 72 as shown in FIG. 5b, and the inner layer 72 is formed of a knitted polyester material that is brushed to produce a pile 134, such material being commonly used to make paint rollers Layers 70, 72 of the FIG. 5c embodiment are laminated using a suitable adhesive 145, such as an acrylic adhesive, but other lamination techniques may be employed as well. It is also possible, and perhaps preferable to aid lamination, to reverse layer 70 so that the polyurethane coating is adjacent to layer 72 and in contact with adhesive 145.

Figure 6:
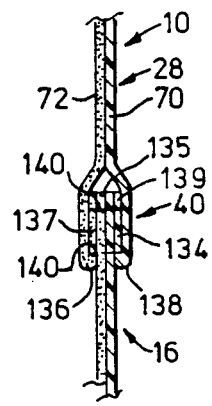
FIG. 6 is a cross-section on line 6—6 of FIG. 1 showing a detail of the seams of the protective cover.

With reference to FIG. 6 there is shown a detail of the seam 40 on line 6—6 of FIG. 1 when the material of FIG. 4 is used to make cover 10. The seams 40 between the several panel members are substantially the same.

The layers 70 and 72 of the rear window panel 28 are separated at their ends and folded on themselves to form fold 136 having inner fold end 137, from the separated end of inner layer 72; a fold 138 having inner fold end 139 from the separated end of outer layer 70.

The free edge 135 of side panel member 16 is sandwiched between fold 136 and 138 and the seam 40 is completed by stitches 140 which extend through inner fold end 137, side panel member 16 and inner fold end 139.

With reference to FIG. 2a, the elastic shock cord 50 is contained within a hem or sleeve 142 at open end 38 of cover 10; the sleeve 142 conveniently being formed by a fold 141 and stitching 143.

Figure 7:
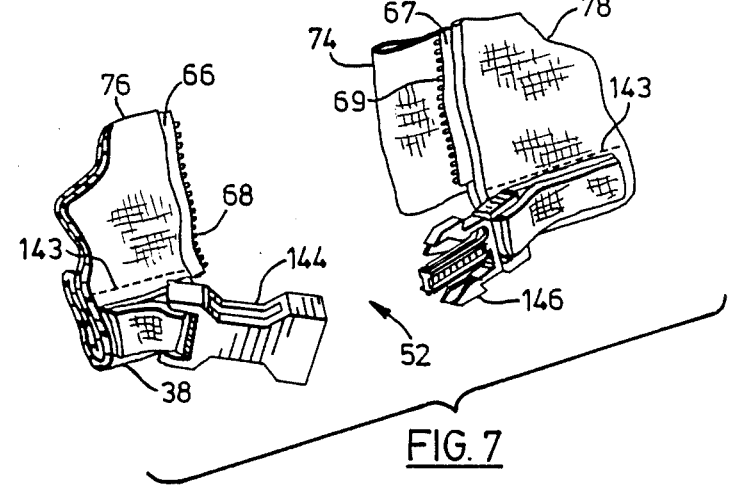
FIG. 7 is an enlarged view contained within the chain-dotted circle 7 of the FIG. 1.

With reference to FIG. 7, interengageable fastener elements 144 and 146 are secured on the outer flap edge 76 and inner panel edge 78 to form fastener 52. Conveniently, (not shown) the free ends of cord 50 may be connected to the fastener elements 144 and 146, respectively, so that the length and thus the tension in elastic cored 50 may be adjusted.

In operation, the protective cover 10 is snugly fitted over an automobile 12 as generally illustrated in FIGS.

1 and 2 with closure 55 closed and fastener 52 fastened, so that open end 38 snugly engages the automobile 12. At this stage in the case of a new automobile 12, the automobile has been cleaned and polished ready for pick-up by the purchaser, but with the protective cover 10, the automobile may remain outside for collection.

Since the automobile 12 is concealed, identification card 60 inserted in pocket 56, provides ready identification of automobile 12 without the need to lift or partially remove the protective cover 10.

If it is necessary to move the automobile 12 within a waiting area prior to pick up by the customer, after the cover 10 has been fitted, fastener elements 144 and 146 on the driver's side are disengaged and zipper 64 is released to open closure 55 whereby flap 54 can be folded back, as shown in hidden detail in FIG. 1. It will be understood that flap 54 is located so that after it is folded or peeled back, it is possible to open the automobile door on the driver's side to permit entrance of a driver. The windows 42 and others (not shown) provide a sufficient view to permit a driver to drive the automobile 12 within a limited area within the waiting area with the cover 10 thereon, whereafter closure 55 and fastener 52 are reclosed. Of course, windows 42, 46 and others (not shown) may be eliminated if desired, especially where the automobile will no normally be moved after it is covered.

In this way, the cleaned and polished surfaces of the new (or any other) automobile 12 remain clean and polished even if the automobile 12 fitted with the protective cover 10 is left standing some time due to delayed collection by the purchaser, or if the automobile 12 is left standing in an area exposed to dust, rain or other environment which would deleteriously affect the appearance of the newly polished automobile 12.

The seams 40 of the protective cover 10 are in particular, located so as not to correspond with the corners of automobile 12. For example, the corners formed by the several panels of the automobile and which represent potential stress points on the cover. By disposing the seams 40 so that they do not correspond to the corners of the automobile 12, stress on the seams 40 is relieved or avoided.

The air permeable inner layer 72 permits "breathing" of the protective cover 10, and this serves to remove any condensation of water vapour or moisture in he air inside the cover which could deleteriously affect the polished surface. The water-proofing of the outer layer 70 prevents passage of liquid water through cover 10, and the inner layer 72 is of a relatively soft material preventing scratching, denting, or marking of the polished surface and additionally functions to polish the automobile body.

It will be understood that the outer layer 70 should not shrink when exposed to water or sun and should not be deleteriously affected by the elements of the environment.

With reference to FIG. 2, where components identical to those in FIG. 1 have been identified with identical reference numerals, an alternative embodiment of cover 10 has a flared side panel 176. Side panel 176 provides a more snug fit of cover 10 over automobile 12 by accommodating the side mirror. Side panel 176 is substantially triangular, and one corner thereof, 175, is disposed at a position approximately corresponding to the driver's side mirror when the cover 10 is mounted on automobile 12.

A security closed looped cord 99 is also shown in FIG. 2. Cord 99 may be a wire rope or a shock cord housed in a flexible metal sheath, or some other suitable construction, which is securely fastened by conventional means to cover 10 at a location proximate to a tire of automobile 12 when cover 10 is fitted over automobile 12. An impediment is thereby provided against theft of cover 10. Without movement of automobile 12 or a forced removal of cord 99 from cover 10, cover 10 is secured to automobile 12.

Cover 10 in FIG. 1 has elastic or shock cord 50 running along the entire periphery of open end 38. In contrast, cover 10 in FIG. 2 has elastic or shock cord 50 only around the front and rear portions of cover 10. For example, the front shock cord 50 terminates on the driver's side as best seen in FIG. 1a.

It is envisaged that a small number of covers 10, perhaps three, will be required to fit a typical range of different automobiles. It is also envisaged that the material of the cover 10 could be made to be elastically stretchable so that each size of cover 10 might fit a wider range of automobiles.

It is also within the scope of the invention to treat the seams 40 for example, by applying a heat seal type tape so as to form a better seal and avoid possible leakage, while at the same time providing reinforcement.

We therefore claim:

1. A convex cover for an automobile, comprising: (a) panels to cover the top and side portions of the automobile; and (b) a closed cord extending securely from said cover at a position proximate an automobile tire when the cover is fitted over the automobile, the length of said cord being sufficient to encircle that portion of an automobile tire in contact with the ground.

2. A convex cover for snugly fitting over an automobile, comprising:
   an upper panel member being shaped to cover snugly the front, top and rear portions of the automobile,
   first and second side panel members being shaped to cover snugly, respectively, the left and right side portions of the automobile, said side members being connected securely by said upper member to form a smooth, convex contour,
   each of said side members having a bottom edge, and said upper member having a front bottom edge and a rear bottom edge, and said sides being aligned to define an open end,
   elastic means along said edges biased to close said open end, and
   a sleeve at said open end, wherein said elastic means includes an elastic cord contained within said sleeve and interengageable fastening members at opposed free ends of said cord, and
   wherein each of said members have a waterproof outer layer and an air-permeable, polishing inner layer in opposed facing relationship, portions of said inner and outer layers being laminated together.

3. A convex cover for snugly fitting over an automobile, comprising:
   an upper panel member being shaped to cover snugly the front, top and rear portions of the automobile,
   first and second side panel members, being shaped to cover snugly, respectively, the left and right side portions of the automobile, said side members being connected securely by said upper member to form a smooth, convex contour, and a closed cord extending from and connected securely to said cover, the length of said cord being sufficient to encircle that portion of an automobile tire in contact with the ground, wherein each of said side members has a bottom edge, and said upper member has a front bottom edge and a rear bottom edge, and said edges are aligned to define an open end, and wherein each of said members has a water-proof outer layer and an air-permeable, polishing inner layer in opposed facing relationship.

4. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, and a closed cord extending from and connected securely to said cover, the length of said cord being sufficient to encircle that portion of an automobile tire in contact with the ground, wherein each of said side members has a bottom edge, and said upper member has a front bottom edge and a rear bottom edge, and said edges are aligned to define an open end, and wherein each of said members has a water-proof outer layer and an air-permeable, polishing inner layer in opposed facing relationship, portions of said inner and outer layers being laminated together.

5. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, and a closed cord extending from and connected securely to said cover, the length of said cord being sufficient to encircle that portion of an automobile tire in contact with the ground, wherein each of said side members has a bottom edge, and said upper member has a front bottom edge and a rear bottom edge, and said edges are aligned to define an open end, elastic means along said edges biased to close said open end, and wherein each of said members has a water-proof outer layer and an air-permeable, polishing inner layer in opposed facing relationship, portions of said inner and outer layers being laminated together.

6. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, and a closed cord extending from and connected securely to said cover, the length of said cord being sufficient to encircle that portion of the automobile tire in contact with the ground, wherein each of said side members has a bottom edge, and said upper member has a front bottom edge and a rear bottom edge, and said edges are aligned to define an open end, and wherein each of said members has a water-proof outer layer and an air-permeable, polishing inner layer in opposed facing relationship, portions of said inner and outer layers being laminated together.

7. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, wherein each of said side members has a bottom edge, and said upper member has a front bottom edge and a rear bottom edge, and said edges are aligned to define an open end, wherein each of said members has a water-proof outer layer and an air-permeable, polishing inner layer in opposed facing relationship, wherein one of said side members is flared at a position corresponding approximately to a side mirror of the automobile when the cover is fitted over the automobile, and further comprising a closed cord extending from and connected securely to said cover, the length of said cord being sufficient to encircle that portion of an automobile tire in contact with the ground.

8. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, and wherein each of said side members has a bottom edge, and said upper member has a front bottom edge and a rear bottom edge, and said edges are aligned to define an open end, wherein each of said members has a water-proof outer layer and an air-permeable, polishing inner layer in opposed facing relationship, portions of said inner and outer layers being laminated together, wherein one of said side members is flared at a position corresponding approximately to a side mirror of the automobile when the cover is fitted over the automobile, and further comprising a closed cord extending from and connected securely to said cover, the length of said cord being sufficient to encircle that portion of an automobile tire in contact with the ground.

9. A convex cover for snugly fitting over an automobile, comprising:

an upper panel member being shaped to cover snugly the front, top and rear portions of the automobile, first and second side panel members, being shaped to cover snugly, respectively, the left and right side portions of the automobile, said side members being connected securely by said upper member to form a smooth, convex contour, and wherein each of said side members has a bottom edge, and said upper member has a front bottom edge and a rear bottom edge, and said edges are aligned to define an open end, elastic means along said edges biased to close said open end, wherein each of said members has a water-proof outer layer and an air-permeable, polishing inner layer in opposed facing relationship, portions of said inner and outer layers being laminated together, wherein one of said side members is flared at a position corresponding approximately to a side mirror of the automobile when the cover is fitted over the automobile, and further comprising a closed cord extending from and connected securely to said cover, the length of said cord being sufficient to encircle that portion of an automobile tire in contact with the ground.

* * * * *